SELECTION OF PERIPHERAL EQUIPMENT IN COMPUTER SYSTEM

Filed Nov. 30, 1959 2 Sheets-Sheet 1

| f | | | | e | | | |
|---|---|---|---|---|---|---|---|
| d | | c | | d | | c | |
| b | a | b | a | b | a | b | a |

INVENTOR
JACK CONNETT
Miles S. Gillam
ATTORNEY

INVENTOR
JACK CONNETT
BY Miles A. Gillam
ATTORNEY

United States Patent Office 3,201,753
Patented Aug. 17, 1965

3,201,753

SELECTION OF PERIPHERAL EQUIPMENT IN COMPUTER SYSTEM

Jack Connett, Swinton, England, assignor to Associated Electrical Industries (Manchester) Limited, a company of Great Britain Filed Nov. 30, 1959, Ser. No. 856,273
2 Claims. (Cl. 340—147)

This invention relates to electronic computer equipment and is more particularly concerned with equipment in which there is a central computer connected to a number of external pieces of equipment, referred to herein as peripheral equipment. The peripheral equipment may comprise various sources of information for example, tape readers, drum stores, core stores, or equipment supplying or receiving information in digital form.

The peripheral equipment may itself perform computing operations or control operations and will, after completion of such operation, require connection to the central computer. It is, therefore, necessary in cases in which there are large numbers of items of peripheral equipment to examine these all in turn to ascertain whether one is conditioned for connection to the central computer.

This operation occupies a considerable time and the main object of the present invention is to provide improved search equipment which appreciably reduces the searching time.

According to the present invention the peripheral equipments are connected to a plurality of pairs of search highways in accordance with a binary code in such manner that interrogating signals through the first pair of search highways determine in which half-group a selected equipment is located, interrogation through the second pair determines in which sub-group of the selected half-group, and each successive interrogation halves the number of possible equipments until unity is reached.

In order that the invention may be more clearly understood reference will now be made to the accompanying drawings in which.

Figures 1, 3:
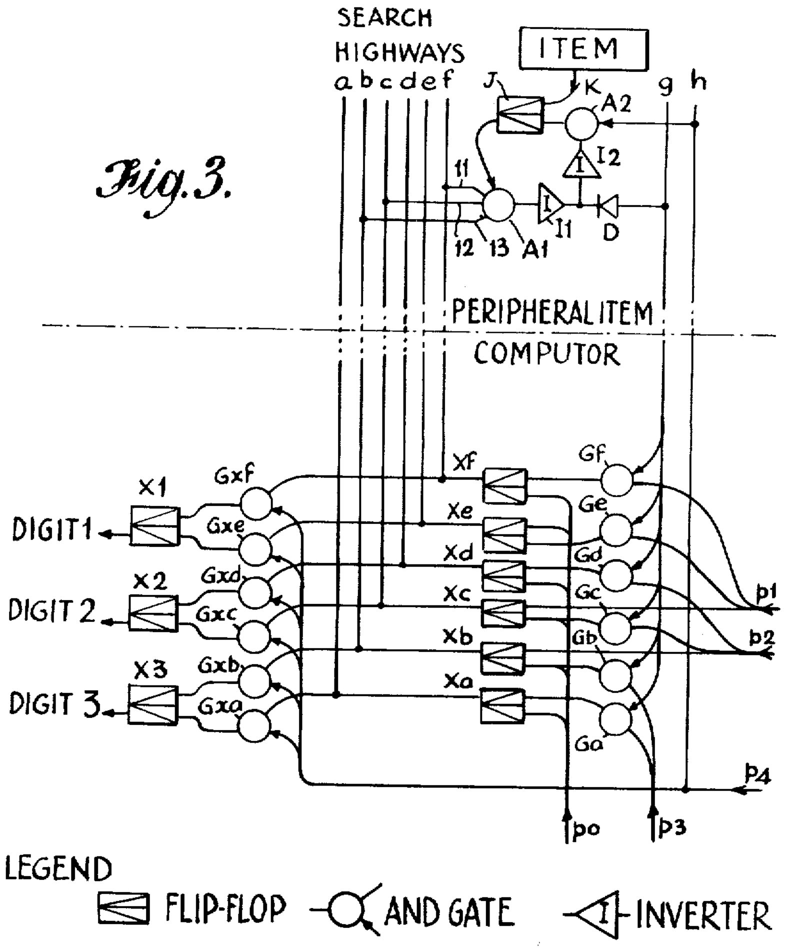
FIG. 1 is an explanatory figure showing graphically the principle underlying the invention.
FIG. 3 shows, also diagrammatically, the principal search apparatus associated with the main computer and with one of the search items of FIG. 2.

FIG. 1 illustrates the searching operation graphically and in the example shown there are assumed to be seven peripheral items and these are shown as firstly arranged in two main groups *e* and *f*. Each of the main groups consist of two sub-groups *c* and *d* while each of the sub groups *c* and *d* comprises an item *a* and an item *b*. When a peripheral item has completed an operation and is ready for connection to the main computer it gives a signal. The procedure is first to examine whether group *f* requires connection to the main computer and if, on interrogation, no result is obtained then group *f* is eliminated and a search connection is made to sub-group *d* of group *e*. Here again if, on interrogation, no result is obtained sub-group *d* of group *e* is eliminated and the search connections are changed to item *b* of sub-group *c* of main group *e* and again if, on interrogation, no result is obtained then the search connections are changed to item *a* of sub-group *c* of group *e* which it follows must be the peripheral item in question.

If however, during the above procedure a signal is received at the computer then an item in that group or sub-group requires connection. For instance, if a signal is received when group *f* is interrogated then clearly an item on either sub-group *d* or sub-group *c* of group *f* requires connection and the procedure would be to examine sub-group *d* of group *f* and then proceed as above.

Whilst the arrangement shown provides for seven peripheral items, it will be appreciated that, of course, the invention is by no means limited in this respect but a greater or lesser number of items may be searched for, for instance, the arrangement may be on a scale of 16 or 32 or even greater and if the number of peripheral items are intermediate these, then clearly some of the connections may be left blank.

Figure 2:
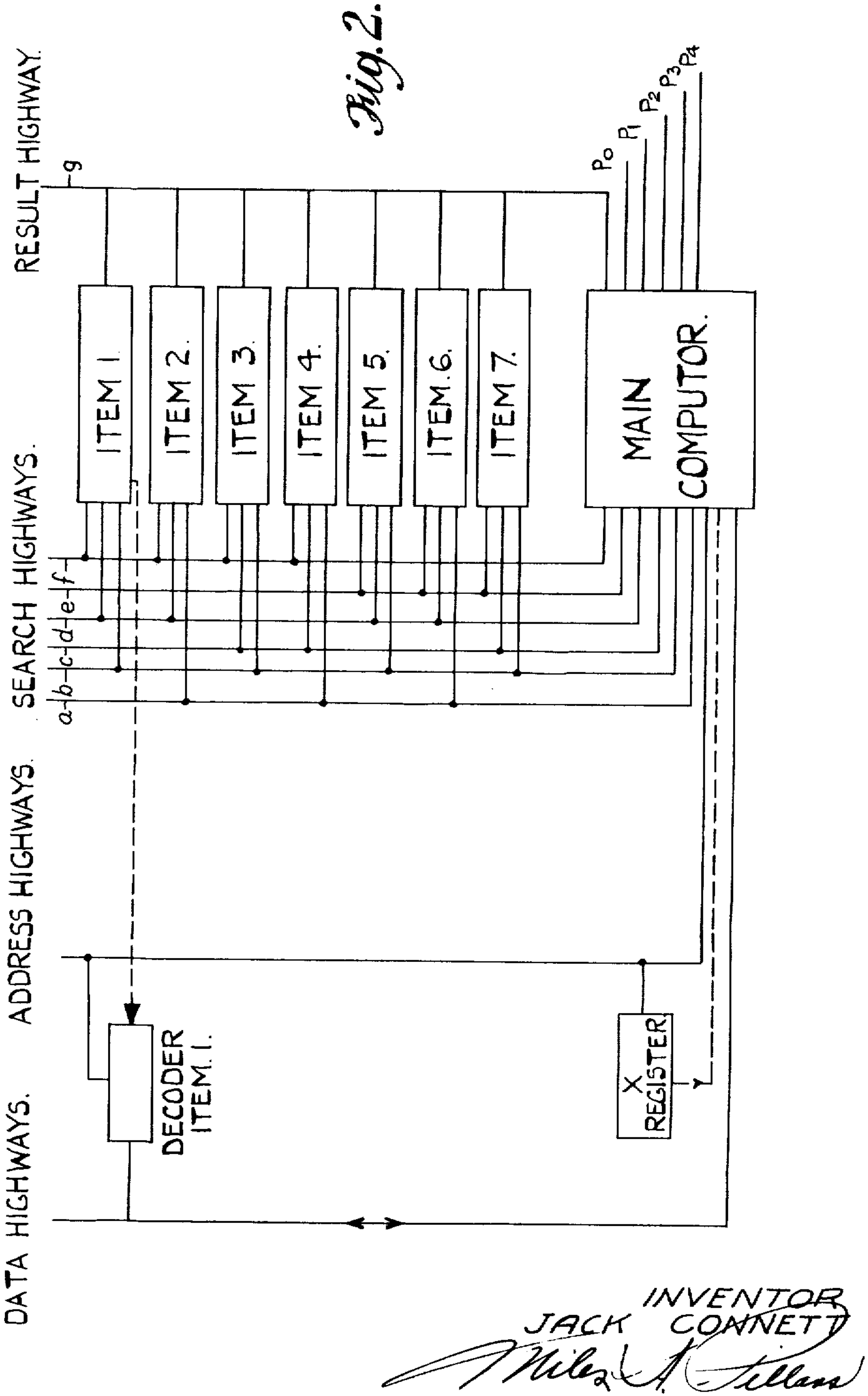
FIG. 2 is a diagrammatic figure in block form showing how searching is carried out.

FIG. 2 shows diagrammatically the interrogating arrangement for the seven peripheral items shown in FIG. 1. In this case there are six search highways *a*, *b*,*c*, *d*, *e*, and *f* shown on the left and a result highway *g* shown on the right. The operation is first to apply a control pulse along line $P_0$ to the main computer. This causes a signal to be sent from the computer along the line *f*, i.e. to peripheral items 1, 2, 3 and 4. Next a control pulse is applied at $P_1$ to the main computer. If a signal has appeared on the result highway *g* then the connection to line *f* will be maintained but if there was no signal on the result highway then the signal will be disconnected and changed over to line *e* and at the same time connection will be made to line *d*, the net result being that sub-group *d* of group *e* is connected to the computer. Line $P_2$ is now energised and this carries out a similar interrogating operation in that if a signal has appeared on the result highway the connections made remain but if there was no signal on the result highway indicating that no peripheral item in this sub-group was conditioned for connection to the computer, then the signal will be removed from line *d* and changed over to line *c*. At the same time line *b* will be connected. $P_3$ will now apply a signal which will effect a similar interrogation signal in that the connection will be maintained if a signal has arrived from the result highway but the signal on line *b* will be changed over to line *a* if there is no signal on the result highway. Finally, $P_4$ resets the peripheral items and connects the active lines of the search highway to an X register, which thus stores in binary coded form a binary designation of the selected peripheral item, it being recognized that a stored zero shows that no peripheral item requires attention.

The above operation will now be described in greater detail in FIG. 3.

In FIG. 3 the search apparatus associated with one of the peripheral items is shown above the horizontal dash line, this corresponds to one of the blocks shown in FIG. 2.

Below the horizontal dash line is the search apparatus associated with the main computer.

On the centre of the figure and extending vertically are the search highway lines *a*–*f*. On the right of the figure is the result highway *g* also shown in FIG. 2, and also a reset highway *h*. The peripheral equipment contains a flip flop J. This is normally in a "Reset" condition but is changed to the "Set" condition by signals applied along the line K and indicating that the peripheral item has completed an operation and requires connection to the computer.

The flip flop is reset by signals from the reset highway *h* acting through the AND gate A2. The output of the flip flop J is connected to one of the inputs to the AND gate A1. The other inputs to the AND gate A1 are from the lines *b*, *c* and *f* by way of conductors 11, 12 and 13. It will be understood that the connections are made selectively, i.e. each item will be connected to a different combination of search highway lines.

As will be explained subsequently, during searching the AND gate A1, in the absence of correct signals, passes a 0 which is inverted by the inverter I1 to produce a ONE on the result highway.

If, however, a ONE appears on all lines 11, 12 and 13 at the same time that the flip flop J is in the "Set" state then a ONE is passed to the inverter I1 which produces a ZERO on the result highway indicating that a peripheral item in group *f* requires connection to the computer.

Within the actual computer the settings of the search highway lines *a–f* are controlled from the control signal lines $P_0$–$P_4$ operating through the registers X*a* . . . X*f*. In cases in which a control line $P_0$–$P_4$ is shown connected to the upper half of a register X*a*–X*f*, as in the case of a $P_0$ signal applied to register X*e* then the register will give a ZERO at its output. In cases in which a signal is shown applied to the lower half of a register then the register will give a ONE at its output.

At the same time signals are fed to the registers from the result highway *g* through the gates G*a*–G*f* and in the example considered it will be assumed that a ZERO signal on the result highway indicates that a peripheral item requires attention but a ONE signal indicates that the group or sub-group or item may be eliminated.

Initially, a signal is applied on the control line $P_0$ and this will set the registers X*a*, X*b*, X*c*, X*d* and X*f* to give a ONE on the lines *a*, *b*, *c*, *d* and *f*, but the register X*e* will give a ZERO on the line *e* as explained above. Thus, the inverted outputs from all peripheral items connected to line *f* will give a ZERO at the result highway.

Thus, if any peripheral item connected to line *f* requires attention and its flip flop J is in the set state its AND gate A1 will pass a ONE which will be inserted and produce a ZERO on the result highway *g* indicating that an item in main group *f* (FIG. 1) requires attention.

If, however, when a control signal is applied to $P_0$ a ONE signal appears on the result highway *g*, it follows by a process of elimination none of the items in group *f* requires attention, but that one or more of the peripheral items connected to the line *e* might require attention since those connected to line *f* have been eliminated.

Next a control signal is applied to $P_1$. Application of signal $P_1$ changes X*c* so that a ZERO signal now appears on search line *c*.

If, when $P_1$ is applied there is a ONE signal on the result highway, indicating that no item in group *f* requires connection to the computer, then signal $P_1$ will also be applied through the gates G*f* and G*e* to reverse the flip flops X*f* and X*e* so that a ZERO signal appears on the line *f* and a ONE signal on line *e*. Referring back to FIG. 1, this means that the items in sub-group *d* of group *e* are now being interrogated, since X*a*, X*b*, and X*c* were set by $P_0$ and have not been changed, sub-group *c* being temporarily eliminated. Next a control pulse is applied at $P_2$; this reverses flip flop X*a* that a ZERO signal now appears on line *a*. At the same time if there is a ONE signal on the result highway, $P_2$ will act through gates G*d* and G*c* to reverse flip flops X*d* and X*c* so that a ZERO signal now appears on line *d*.

Referring again to FIG. 1 this means that item *b* of sub-group *c* of main group *e* is being interrogated.

Next a control signal is applied to $P_3$. If, at this time, there is a ONE on the result highway then $P_3$ will act through G*b* and G*a* to reverse X*b* and X*a*.

Referring once more to FIG. 1 this means that by a process of elimination the required item is *a* of sub-group *d* of main group *e*. This means nothing selected.

It will, therefore, be understood that when pulse $P_1$ is applied the correct half is selected. When pulse $P_2$ is applied the correct quarter is selected, i.e. *d* or *c* sub-group of the half selected previously.

The typical system of FIG. 3 works as follows. Flip flop J is set in each peripheral item via line K when the item is ready for a unit data transfer. Meanwhile, a sequence of p-pulses $P_0$–$P_4$ is fed to the system during the current computer sequence. Now for each peripheral item, connections 11–13 are uniquely made to the search highways *a–f* in the following manner. Items are alloted a binary coded designation, say from 001 to 111. In each item, the connection scheme depends on its designation:

If 1st digit of designation is 1, connect 11 to *f*
If 1st digit of designation is 0, connect 11 to *e*
If 2nd digit of designation is 1, connect 12 to *d*
If 2nd digit of designation is 0, connect 12 to *c*
If 3rd digit of designation is 1, connect 13 to *b*
If 3rd digit of designation is 0, connect 13 to *a*

Thus the peripheral item shown is designated 101. The highway pairs correspond to the designation digits. After pulse $P_0$, all highway pairs show a logic 1 except for *e*. The result highway *g* shows a 0 if any flip-flop J in items whose first designation digit is 1 are set. Now pulse $P_1$ comes along and it changes flip-flops X*e* and X*f* only if the result highway was showing a 1. Pulse $P_1$ also sets via X*d* a 0 on highway *d*. What all this means logically is that we have stored in X*e* and X*f* the search result in respect of the first digit; if X*e*–X*f* were altered, we assume a set peripheral item in the group possessing a first designation digit of 0. By setting highway *d* to zero, we are now going to examine the second digit groups, having excluded half the peripheral items. After pulse $P_3$, selection is complete; if any items were set at all, the coded designation of the highest priority item appears in X*b*, X*d*, X*f* and can be transferred by pulse $P_4$ to result register X; if no items were set, 000 is transferred from which suitable logic circuits dictate that the computer will proceed in a normal sequence and not be interrupted to perform a peripheral data transfer sequence. The order of selection priority in the above case is from 111 to 001. $P_4$ also resets J in selected buffer and in no other.

Finally after the selection is completed a pulse applied at $P_4$ acts through the AND gate A2 to reset J if a signal applied through inverter I2 indicates that the flip flop is in the "Set" state. Otherwise, of course, $P_4$ will have no effect. Reset pulse $P_4$ will also transfer the code to the registers X1, X2, X3 through the gates GX*a*–GX*f* connected to the lines *a–f*.

Referring once again to FIG. 2, when a number has been stored in the X register indicating that this peripheral item requires attention, the information is passed to the computer which sends an appropriate code signal along the address highways. This is decoded by the item in question and connects the item to the data highways to send or receive information. This particular apparatus does not form part of this invention but is the subject of copending application Serial No. 856,274.

What I claim is:

1. Electronic computing apparatus comprising a computer, a plurality of peripheral equipments arranged for intermittent connection with the computer for transfer of data, said equipments being grouped for searching in half groups and successively halved sub-groups until individual equipments are reached, a plurality of pairs of search highways, those forming the first pair being respectively connected to the two half groups and those forming other pairs being respectively connected to successively lower sub-groups so that each peripheral equipment is connected to a different combination of highways, means whereby on transmission of an interrogating signal along one of the first pair of highways a result signal is transmitted to the computer, means whereby on reception of a result signal indicating that no equipment in the half group connected to said first highway requires attention the computer is connected to the second highway of the first pair, and means for repeating said interrogation sequence on the pairs of search highways connected to successively lower sub-groups until an individual equipment is reached.

2. Electronic computing apparatus comprising a computer, a plurality of peripheral equipments arranged for intermittent connection with the computer for transfer of data, said equipments being grouped for searching in half groups and successively halved sub-groups until individual equipments are reached, a plurality of pairs of search highways, those forming the first pair being respectively connected to the two half groups and those forming other pairs being respectively connected to successively lower sub-groups so that each peripheral equipment is connected to a different combination of highways, means whereby on transmission of an interrogating signal along one of the first pair of highways a result signal is transmitted to the computer, means whereby on reception of a result signal indicating that no equipment in the half group connected to said first highway requires attention the computer is connected to the second highway of the first pair, means for repeating said interrogation sequence on the pairs of search highways connected to successively lower sub-groups until an individual equipment is reached, and a binary store actuated by said result signals to store the address of an equipment requiring connection to the main computer.

References Cited by the Examiner

UNITED STATES PATENTS

| | | | |
|---|---|---|---|
| 2,847,658 | 8/58 | Adams | 340—172.5 |
| 2,885,659 | 5/59 | Spielberg | 340—146.2 |

OTHER REFERENCES

The proceedings of the Institution of Electrical Engineers, vol. 102, Part B, March 1955, pages 155–165.

NEIL C. READ, *Primary Examiner.*

EVERETT R. REYNOLDS, ROBERT H. ROSE, *Examiners.*